(12) United States Patent
Kuwata

(10) Patent No.: US 6,756,926 B2
(45) Date of Patent: Jun. 29, 2004

(54) OPTICAL TRANSMITTER AND CODE CONVERSION CIRCUIT USED THEREFOR

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/322,334

(22) Filed: Dec. 18, 2002

(65) Prior Publication Data

US 2003/0118351 A1 Jun. 26, 2003

Related U.S. Application Data

(63) Continuation of application No. PCT/JP00/04170, filed on Jun. 26, 2000.

(51) Int. Cl.[7] .................................................. H03M 1/00
(52) U.S. Cl. ...................................................... 341/137
(58) Field of Search ................................. 341/137, 155, 341/156; 359/245

(56) References Cited

U.S. PATENT DOCUMENTS 6,404,365 B1 * 6/2002 Heflinger .................... 334/137

FOREIGN PATENT DOCUMENTS

| JP | 56-37755 | 4/1981 |
| JP | 3-200923 | 9/1991 |
| JP | 8-139681 | 5/1996 |
| JP | 2000-106543 | 4/2000 |

* cited by examiner

*Primary Examiner*—Brian Young
(74) *Attorney, Agent, or Firm*—Staas & Halsey LLP

(57) ABSTRACT

The present invention is configured to include a code conversion circuit that is supplied with first and second signals having a first bit rate, and generates and outputs, through Exclusive-OR operation, third and fourth signals from which signals obtained by simply bit-multiplexing the first and second signals and having a bit rate twice the first bit rate are obtained, and an optical transmission circuit that performs optical modulation by a both-side electrode Mach-Zehnder type optical modulator using the third and fourth signals output by the code conversion circuit, and outputs an optical signal that is Exclusive-OR of the third and fourth signals. Hence, the output optical signal is Exclusive-OR of the third and fourth signals, that is, a signal obtained by simply bit-multiplexing the first and second signals and having a twice bit rate, and thus it is possible to transmit a high-speed optical signal having a twice bit rate with respect to the electronic signals.

11 Claims, 10 Drawing Sheets

OPTICAL TRANSMITTER AND CODE CONVERSION CIRCUIT USED THEREFOR

This application is a continuing application, filed under 35 U.S.C. §111(a), of International Application PCT/JP00/04170, filed Jun. 26, 2000.

TECHNICAL FIELD

The present invention relates to an optical transmitter and a code conversion circuit used therefor, and more particularly to an optical transmitter of a high-speed optical communication system and a code conversion circuit used therefor.

BACKGROUND ART

Recently, a high-speed optical communication system that transmits at an ultra high-speed more than a transmission rate of 10 Gb/s using a long-distance optical fiber has been developed in haste. In the case where the system must be developed before the improvement of the high-speed characteristics of an electronic device, the high-speed characteristics of an electronic circuit hardly catches up with the high-speed characteristics required for an optical transmission circuit.

FIG. 1 is a block diagram of an example of an output part of a conventional optical transmitter. In the same figure, a plurality of series of low-speed electronic signals and a clock are supplied to a serializer 10 so as to obtain a high-speed electronic signal and a clock. The high-speed electronic signal and the clock are supplied to a D-type flip flop 14 of an optical transmission circuit 12 where waveform shaping is performed, and thereafter, supplied to a drive circuit 16 so as to drive an optical modulator 18 and are converted to a high-speed optical signal. The optical modulator 18 turns on a light in response to a value 1 of data and turns off the light in response to a value 0, for example. The high-speed optical signal is transmitted to an optical fiber 20. In this case, the bit rate of the optical signal is determined by the bit rates of the serializer 10, the D-type flip flop 14 and drive circuit 16 of the optical transmission circuit 12, which are the circuits handling the electronic signal. It is impossible to speed up the bit rate of the optical signal more than the working speed of these circuits that handle the electronic signal.

Incidentally, in Japanese Laid-Open Patent Application No. 3-200923 etc., the applicant has proposed an optical transmission circuit as shown in FIG. 2, which converts a plurality of series of low-speed electronic signals to a high-speed optical signal by using a both-side electrode Mach-Zehnder type optical modulator. In FIG. 2, a first low-speed electronic signal is synchronized with a clock in a D-type flip flop 22 and supplied to a drive circuit 26. In addition, a second low-speed electronic signal is synchronized with the clock in a D-type flip flop 24, delayed by a delay circuit 28 only for a half cycle T/2 when the data cycle of each of the low-speed electronic signals is T, and supplied to a drive circuit 30. A both-side electrode Mach-Zehnder type optical modulator 32 is driven by each of the drive circuits 26 and 30, and generates and transmits, to an optical fiber 34, a high-speed optical signal in which the first and second low-speed electronic signals are multiplexed. In this case, the bit rate of the optical signal is twice that of each of the electronic signals.

Here, a description will be given of a case where two series of low-speed electronic signals are supplied and parallel-serial conversion is performed thereon. A low-speed electronic signal (a1, a2, . . . ) indicated by FIG. 3(A) and a low-speed electronic signal (b1, b2, . . . ) indicated by FIG. 3(B) are supplied to the serializer 10, and a high-speed electronic signal (a1, b1, a2, b2, . . . ) indicated by FIG. 3(C) is obtained. The optical modulator 18 performs optical modulation using the high-speed electronic signal, and a high-speed optical signal indicated by FIG. 3(D) is transmitted.

On the other hand, in the optical transmission circuit in FIG. 2, in a case where a first low-speed electronic signal (a1, a2, . . . ) indicated by FIG. 4(A) and a second low-speed electronic signal (b1, b2, . . . ) indicated by FIG. 4(B) that have the same wave forms as those in FIGS. 3(A), (B) are supplied to the flip-flop 22, 24, respectively, the output of the delay circuit 28 is delayed only for a half cycle T/2 as indicated by FIG. 4(C). The both-side electrode Mach-Zehnder type optical modulator 32 outputs a high-speed optical signal indicated by FIG. 4(D) that is Exclusive-OR of the signal of FIG. 4(A) and the signal of FIG. 4(B). It should be noted that, in FIG. 4(D), "+" represents Exclusive-OR operation.

By the way, the optical transmission circuit shown in FIG. 2 is for a case where the first and second low-speed electronic signals have the same phase. However, in a case where the second low-speed electronic signal is delayed from the first low-speed electronic signal for the half cycle T/2, as shown in a block diagram of FIG. 5, the second low-speed electronic signal is supplied to a D-type flip flop 25 that latches with an inversion clock and supplied to the drive circuit 30 without delaying the output. In FIG. 5, those parts that are the same as those corresponding parts in FIG. 2 are designated by the same reference numerals, and a description thereof will be omitted.

As described above, in the circuit of FIG. 1, the input low-speed electronic signals are simply bit-multiplexed and the high-speed optical signal indicated by FIG. 3(D) is output. While in the circuit of FIG. 2, the signal obtained by performing Exclusive-OR operation on the input first and second low-speed electronic signals is output as the high-speed optical signal. Since the above-described two circuits have different patterns of the high-speed optical signal, it has not been possible to use the optical transmission circuit in FIG. 2 instead of the optical transmission circuit 12 shown in FIG. 1.

For example, it is conceivable to prepare two serializers 10 shown in FIG. 1 and obtain a further higher speed optical signal by supplying the high-speed electronic signals output by each of the serializers to the flip flops 22, 24 of the optical transmission circuit in FIG. 2. However, in this case, there was a problem in that the Exclusive-OR of the output signals of the two serializer is output as an optical signal, and an optical signal that is obtained by simply bit-multiplexing the output signals of the two serializers cannot be output.

DISCLOSURE OF THE INVENTION

It is a general object of the present invention to provide an optical transmitter that can obtain a simply bit-multiplexed optical signal by using an optical transmission circuit employing a both-side electrode Mach-Zehnder type optical modulator and transmit a high-speed optical signal having a twice bit rate with respect to electronic signals, and to provide a code conversion circuit used therefor.

In order to achieve the object, the present invention is configured to include a code conversion circuit that is supplied with first and second signals having a first bit rate, and generates and outputs, through Exclusive-OR operation, third and fourth signals from which signals obtained by simply bit-multiplexing the first and second signals and having a bit rate twice the first bit rate are obtained, and an optical transmission circuit that performs optical modulation by a both-side electrode Mach-Zehnder type optical modulator using the third and fourth signals, and outputs an optical signal that is Exclusive-OR of the first and fourth signals.

According to such an optical transmitter, the output optical signal is Exclusive-OR of the third and fourth signals, that is, a signal obtained by simply bit-multiplexing the first and second signals and having a twice bit rate, and thus it is possible to transmit a high-speed optical signal having a twice bit rate with respect to electronic signals.

BEST MODE FOR CARRYING OUT THE INVENTION

Figure 1:
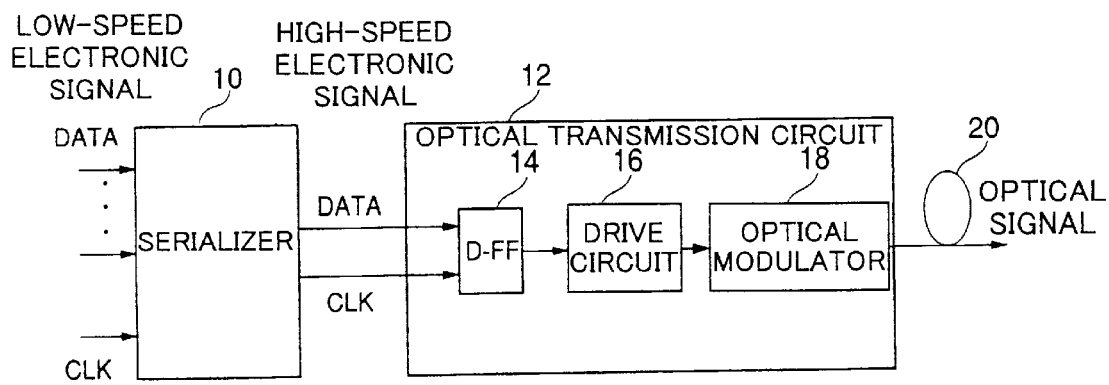
FIG. 1 is a block diagram of an example of an output part of a conventional optical transmitter.

Hereinafter, a description will be given of embodiments of the present invention, by referring to the drawings.

Figure 6:
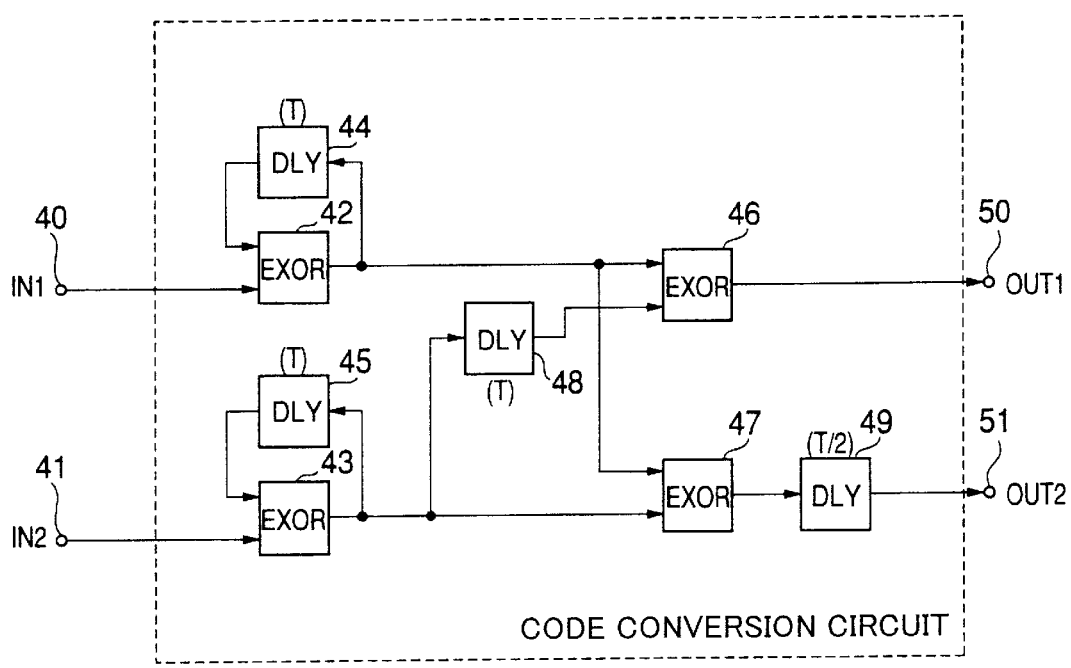
FIG. 6 is a system block diagram of a first embodiment of a code conversion circuit of the present invention.
Figure 7:
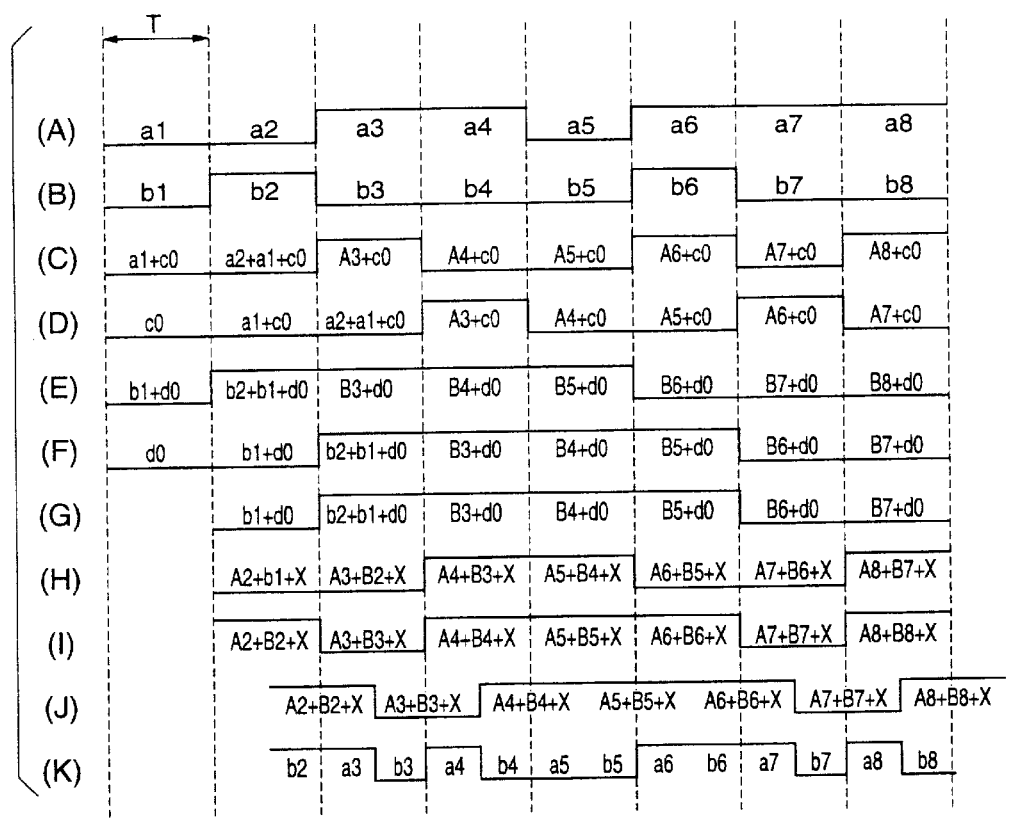
FIG. 7 is a signal timing chart of each part of the circuit in FIG. 6.

FIG. 6 is a system block diagram of a first embodiment of a code conversion circuit of the present invention, and FIG. 7 is a signal timing chart of each part of the circuit in FIG. 6. In FIG. 6, an electronic signal (a1, a2, ...) indicated by FIG. 7(A) is input to a terminal 40 and supplied to one input terminal of an Exclusive-OR circuit (EXOR) 42, and an electronic signal (b1, b2, ...) indicated by FIG. 7(B) is input to a terminal 41 and supplied to one input terminal of an Exclusive-OR circuit (EXOR) 43.

The output of the Exclusive-OR circuit 42 is delayed only for one cycle T by a delay circuit (DLY) 44 when the data cycle of the electronic signal is T and a signal indicated by FIG. 7(D) is obtained. The signal is supplied to the other input terminal of the Exclusive-OR circuit 42. Hence, a signal indicated by FIG. 7(C) and obtained by Exclusive-OR operation in the Exclusive-OR circuit 42 is output.

The output of the Exclusive-OR circuit 43 is delayed only for one cycle T by a delay circuit 45, and a signal indicated by FIG. 7(F) is obtained and supplied to the other input terminal of the Exclusive-OR circuit 43. Hereby, a signal obtained through Exclusive-OR operation by the Exclusive-OR circuit 43 and indicated by FIG. 7(E) is output. Further, in FIG. 7, "+" represents Exclusive-OR operation, c0, d0 are initial values of the delay circuits 44, 45, X=c0+d0, An is Exclusive-OR of a1 through an, and Bn is Exclusive-OR of b1 through bn.

The output of the above-described Exclusive-OR circuit 42 is supplied to one input terminal of each of Exclusive-OR circuits 46, 47. The output of the Exclusive-OR circuit 43 is delayed only for one cycle T by a delay circuit 48, and a signal indicated by FIG. 7(G) is obtained and supplied to the other input terminal of the Exclusive-OR circuit 46, and at the same time, to the other input terminal of an Exclusive-OR circuit 47 without delay.

The Exclusive-OR circuit 46 performs Exclusive-OR operation of the signal indicated by FIG. 7(C) and the signal indicated by FIG. 7(G), and outputs a signal indicated by FIG. 7(I) from a terminal 50. In addition, the Exclusive-OR circuit 47 performs Exclusive-OR operation of the signal indicated by FIG. 7(C) and the signal indicated by FIG. 7(E) and obtains the signal indicated by FIG. 7(I). The signal is delayed by a delay circuit 49 only for ½ cycle T/2, and a signal indicated by FIG. 7(J) is obtained and output from a terminal 51.

Figure 2:
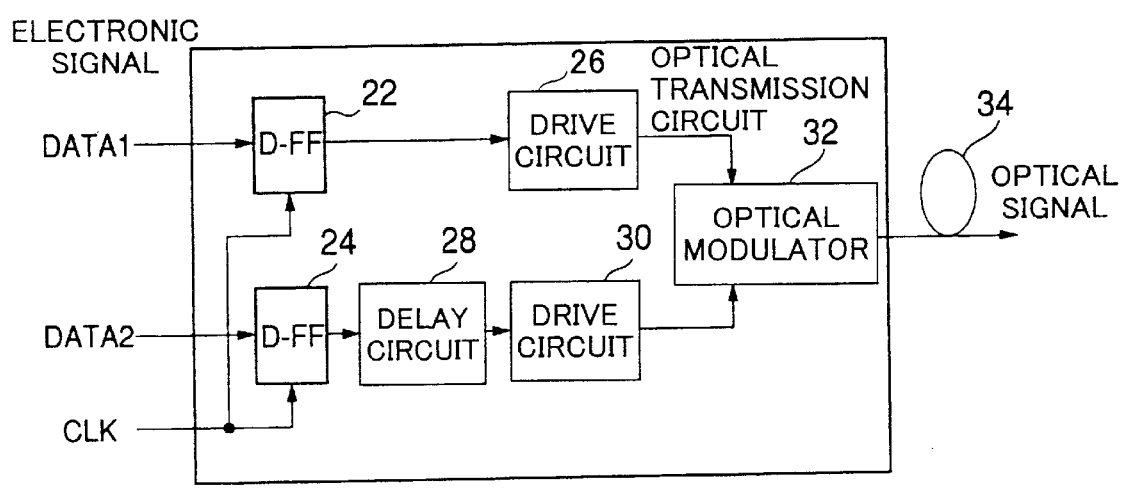
FIG. 2 is a block diagram of an example of an optical transmission circuit using a both-side electrode Mach-Zehnder type optical modulator.
Figure 3:
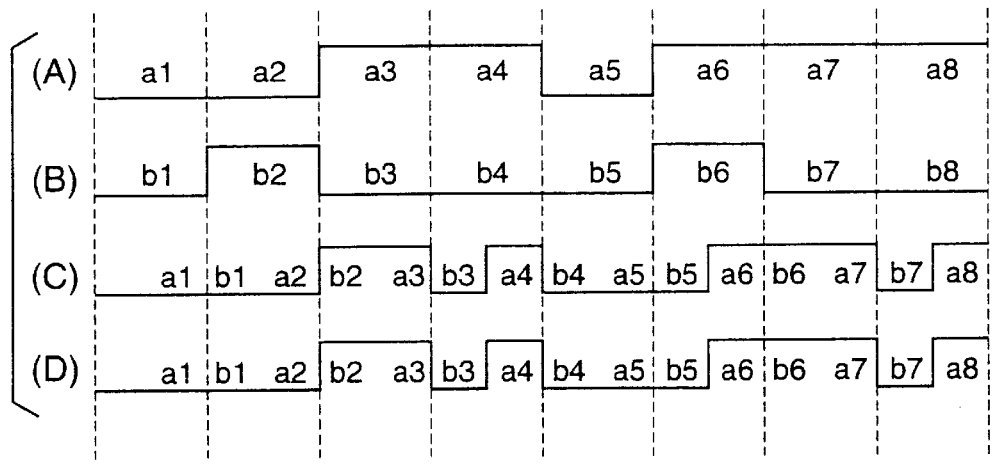
FIG. 3 is a signal timing chart of each part of the circuit in FIG. 1.
Figure 4:
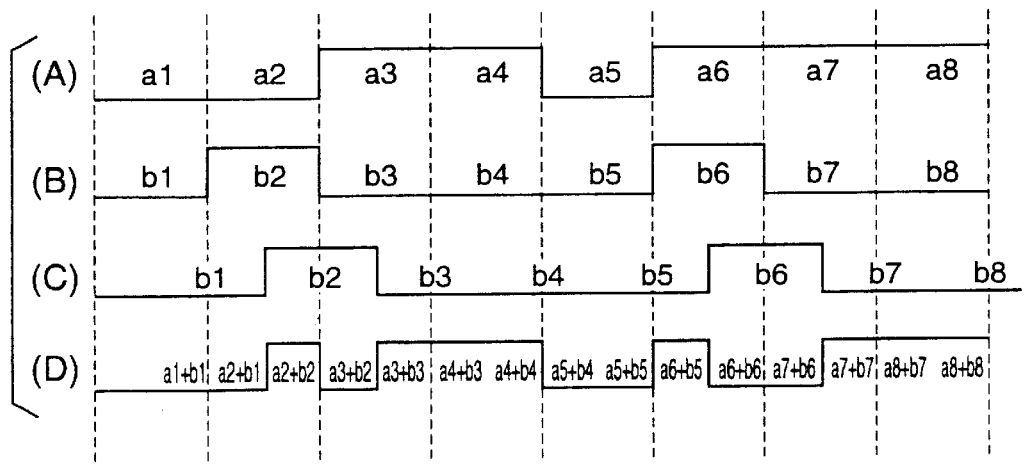
FIG. 4 is a signal timing chart of each part of the circuit in FIG. 2.

Here, when Exclusive-OR operation of the signal indicated by FIG. 7(I) output from the terminal 50 and the signal indicated by FIG. 7(J) output from the terminal 51 is performed, as indicated by FIG. 7(K), a signal (b2, a3, b3, a4, ...) is obtained. The signal is obtained by simply bit-multiplexing two series of signals input to the terminals 40, 41. In other words, when two series of the electronic signals output from the terminals 50, 51 in FIG. 6 are supplied to the optical transmission circuit employing the both-side electrode Mach-Zehnder type optical modulator shown in FIG. 2, it is possible to obtain an optical signal in which two series of the signals are simply bit-multiplexed.

Figure 8:
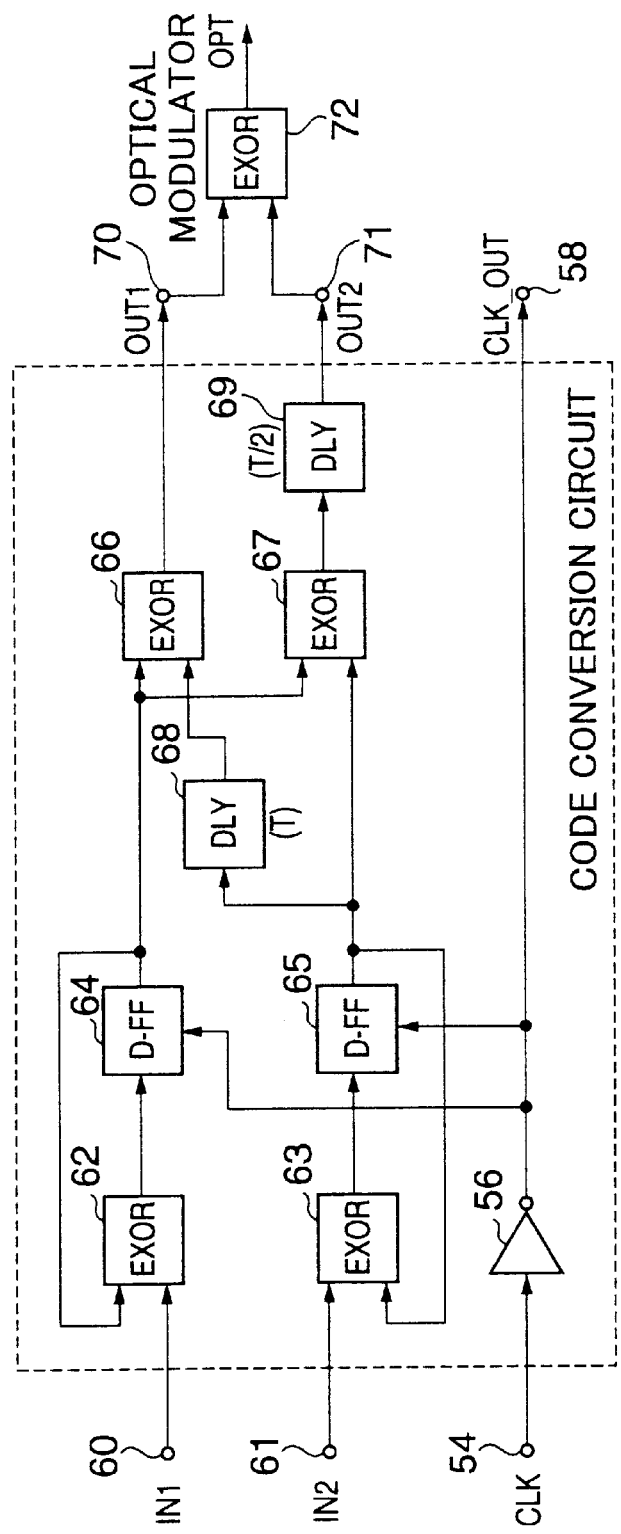
FIG. 8 is a system block diagram of a second embodiment of the code conversion circuit of the present invention.
Figure 9:
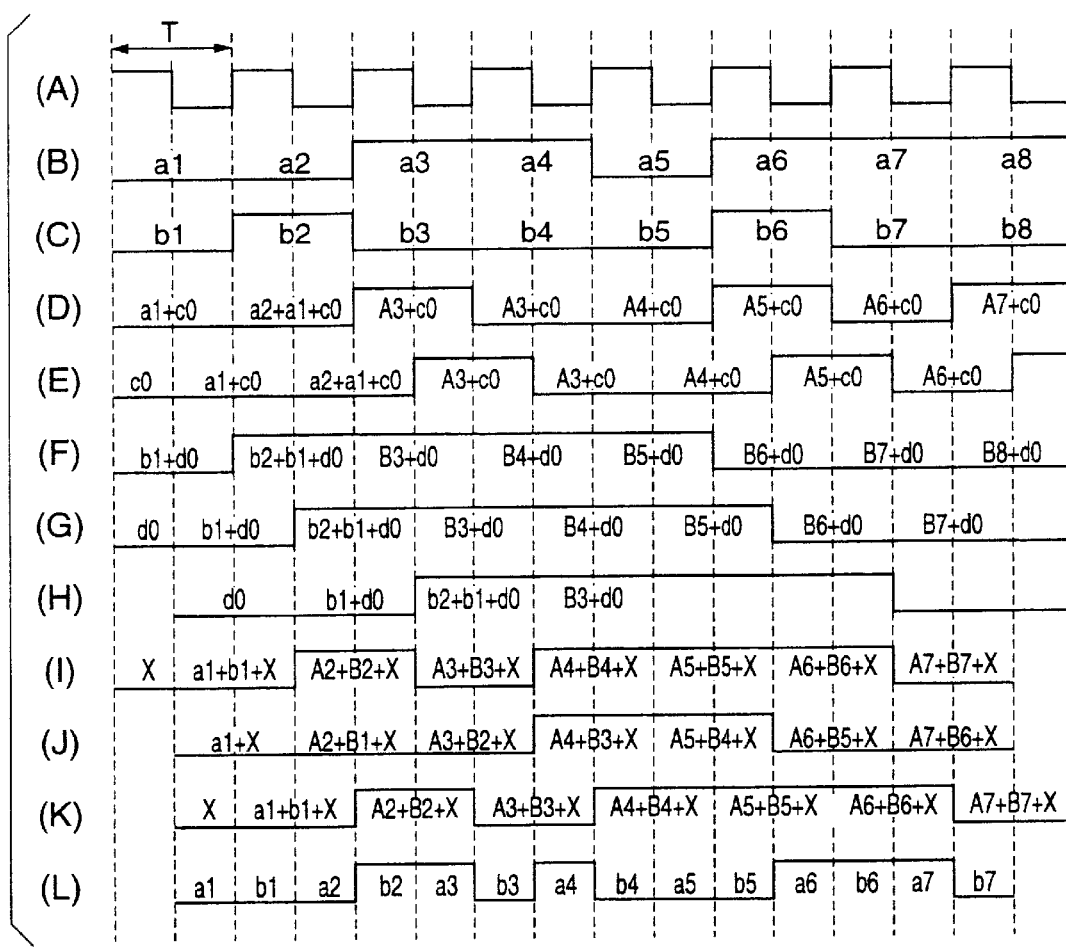
FIG. 9 is a signal timing chart of each part of the circuit in FIG. 8.

FIG. 8 is a system block diagram of a second embodiment of the code conversion circuit of the present invention, and FIG. 9 is a signal wave form chart of each part of the circuit in FIG. 8. In FIG. 8, a clock CLK indicated by FIG. 9(A) is input to a terminal 54, inverted by an inverter 56 and output from a terminal 58. An electronic signal (a1, a2, ...) indicated by FIG. 9(B) is input to a terminal 60 and supplied to one input terminal of an Exclusive-OR circuit (EXOR) 62. An electronic signal (b1, b2, ...) indicated by FIG. 9(C) is input to a terminal 61 and supplied to one input terminal of an Exclusive-OR circuit (EXOR) 63. The values of the above-described two series of electronic signals is varied in synchronization with a rising edge of the clock CLK indicated by FIG. 9(A).

The output of the Exclusive-OR circuit 62 is delayed by a D-type flip flop 64 synchronizing the inverted clock output from the inverter 56 only for one cycle T when the data cycle of the electronic signal is T, and supplied to the other input terminal of the Exclusive-OR circuit 62. Hence, a signal obtained through Exclusive-OR operation by the Exclusive-OR circuit 62 and indicated by FIG. 9(D) is output.

The output of the Exclusive-OR circuit 63 is delayed by a D-type flip flop 65 synchronizing with the inverse clock output by the inverter 56 only for one cycle T, and a signal indicated by FIG. 9(G) is obtained and supplied to the other input terminal of the Exclusive-OR circuit 63. Hence, a signal obtained through Exclusive-OR operation by the Exclusive-OR circuit 63 and indicated by FIG. 9(F) is output. Further, in FIG. 9, "+" represents Exclusive-OR operation, c0, d0 are initial values of the flip flops 64, 65, X=c0+d0, An is Exclusive-OR of a1 through an, and Bn is Exclusive-OR of b1 through bn.

The output of the above-described flip flop 64 is input to one input terminal of each of Exclusive-OR circuits 66, 67. The output of the flip flop 65 is delayed by a delay circuit 68 only for one cycle T, and a signal indicated by FIG. 9(H) is obtained and supplied to the other input terminal of the Exclusive-OR circuit 66, and at the same time, to the other input terminal of the Exclusive-OR circuit 67 without being delayed.

The Exclusive-OR circuit 66 performs Exclusive-OR operation of the signal indicated by FIG. 9(E) and the signal indicated by FIG. 9(H), and outputs a signal indicated by FIG. 9(J) from a terminal 70. In addition, the Exclusive-OR circuit 67 performs Exclusive-OR operation of the signal indicated by FIG. 9(E) and the signal indicated by FIG. 9(G) and obtains a signal indicated by FIG. 9(I). The signal is delayed by a delay circuit 69 only for ½ cycle T/2, and a signal indicated by FIG. 9(K) is obtained and output from a terminal 71.

Here, when the both-side electrode Mach-Zehnder type optical modulator performs Exclusive-OR operation of the signal indicated by FIG. 9(J) output from the terminal 70 and the signal indicated by FIG. 9(K) output from the terminal 71, an optical signal (a1, b1, a2, b2, a3, . . . ) indicated by FIG. 9(L) is obtained. The signal is obtained by simply multiplexing two series of the signals input to the terminals 60, 61.

Figure 10:
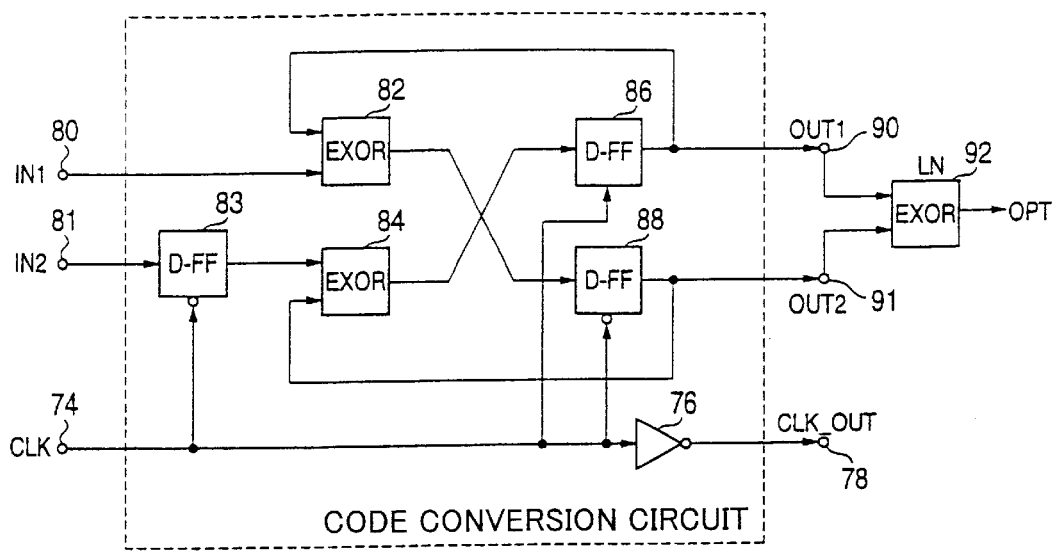
FIG. 10 is a system block diagram of a third embodiment of the code conversion circuit of the present invention.
Figure 11:
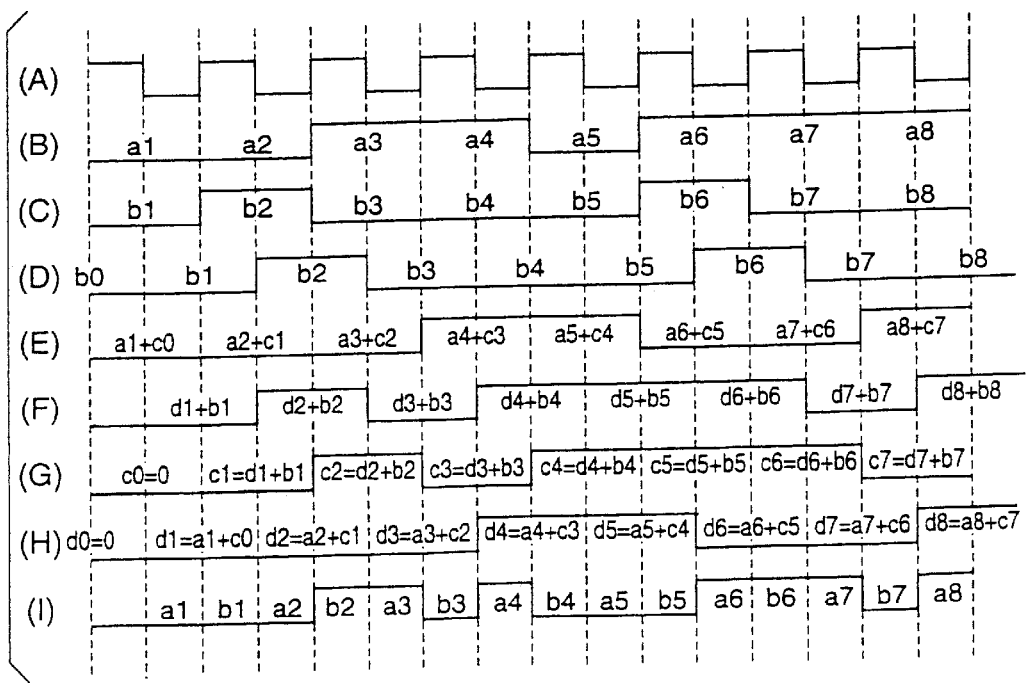
FIG. 11 is a signal timing chart of each part of the circuit in FIG. 10.

FIG. 10 is a system block diagram of a third embodiment of the code conversion circuit of the present invention, and FIG. 11 is a signal wave form diagram of each part of the circuit in FIG. 10. In FIG. 10, a clock CLK indicated by FIG. 11(A) is input to a terminal 74, inverted by an inverter 76 and output from a terminal 78. An electronic signal (a1, a2, . . . ) indicated by FIG. 11(B) is input to a terminal 80 and supplied to one input terminal of an Exclusive-OR circuit (EXOR) 82, and an electronic signal (b1, b2, . . . ) indicated by FIG. 11(C) is input to a terminal 81 and supplied to a data input terminal of a D-type flip flop 83. The flip flop 83 is supplied with the clock CLK to an inverse clock input terminal, and supplies an electronic signal fed to the data input terminal to one input terminal of an Exclusive-OR circuit 84 by delaying the electronic signal only for ½ cycle, T/2, as indicated by FIG. 11(D) when the data cycle of the electronic signal is T. Further, the values of two series of the electronic signals at the terminals 80, 81 vary in synchronization with a rising edge of the clock CLK indicated by FIG. 11(A).

The Exclusive-OR circuit 82 is supplied with the output signal of a D-type flip flop 86 indicated by FIG. 11(G) to the other input terminal, performs Exclusive-OR operation of the supplied two signals so as to generate and supply a signal indicated by FIG. 11(E) to a D-type flip flop 88. The Exclusive-OR circuit 84 is supplied with the output signal of the D-type flip flop 88 indicated by FIG. 11(H) to the other input terminal, performs Exclusive-OR operation of the supplied two signals so as to generate and supply a signal indicated by FIG. 11(F) to the D-type flip flop 86.

The flip flop 86 is supplied with the clock CLK to the clock input terminal, delays a signal supplied to the data input terminal only for ½ cycle, T/2, supplies a signal indicated by FIG. 11(G) to the Exclusive-OR circuit 82, and at the same time, outputs the signal from a terminal 90. The flip flop 88 is supplied the clock CLK to the inverse clock input terminal, delays a signal supplied to the data input terminal only for ½ cycle, T/2, supplies a signal indicated by FIG. 11(H) to the Exclusive-OR circuit 84, and at the same time, outputs the signal from a terminal 91.

Here, when Exclusive-OR operation of the signal output by the terminal 90 and indicated by FIG. 11(G) and the signal output by the terminal 91 and indicated by FIG. 9(H) is performed by a succeeding both-side electrode Mach-Zehnder type optical modulator 92, an optical signal (a1, b1, a2, b2, a3, . . . ) as indicated by FIG. 11(I) is obtained. In addition, the circuit shown in FIG. 10 requires a less number of circuit elements such as Exclusive-OR circuits and delay circuits with respect to the circuit shown in FIG. 8.

Figure 5:
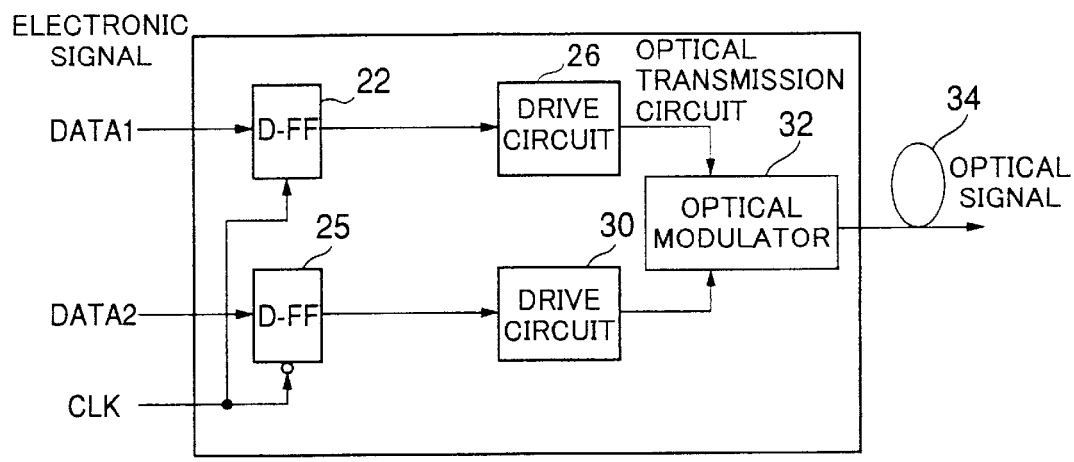
FIG. 5 is a block diagram of another example of the optical transmission circuit using the both-side electrode Mach-Zehnder type optical modulator.
Figure 12:
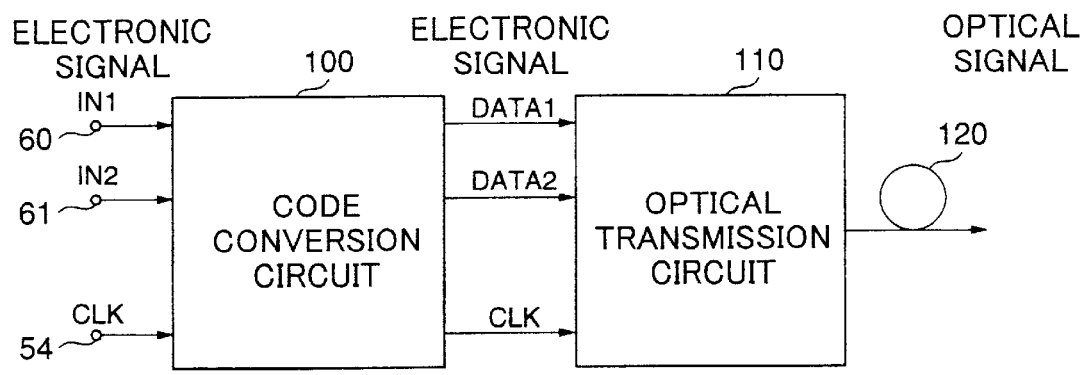
FIG. 12 is a block diagram of a first embodiment of an optical transmitter using the code conversion circuit of the present invention and the both-side electrode Mach-Zehnder type optical modulator.

Next, a description will be given of an optical transmitter using the code conversion circuit of the present invention and a both-side electrode Mach-Zehnder type optical modulator, by referring to FIGS. 12 through 15. In FIG. 12, a code conversion circuit 100 having the configuration shown in FIG. 8 generates electronic signals indicated by FIGS. 9(J), (K) from the electronic signals supplied to the terminals 60, 61 and indicated by FIGS. 9(B), (C) and the clock CLK supplied to the terminal 54 and indicated by FIG. 9(A), and supplies the electronic signals to an optical transmitter 110 employing a both-side electrode Mach-Zehnder type optical modulator. The optical transmitter 110 having the configuration shown in FIG. 5 is supplied with the electronic signals indicated by FIG. 9(J) and FIG. 9(K) and the inverse clock, generates the optical signal (a1, b1, a2, b2, a3, . . . ) as indicated by FIG. 9(L) obtained by bit-multiplexing the electronic signals indicated by FIGS. 9(B), (C), and transmits the optical signal to an optical fiber 120.

Figure 13:
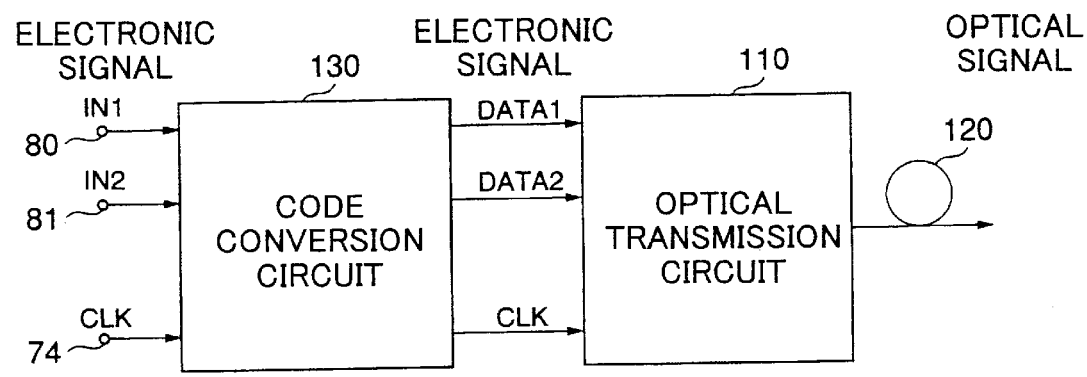
FIG. 13 is a block diagram of a second embodiment of the optical transmitter using the code conversion circuit of the present invention and the both-side electrode Mach-Zehnder type optical modulator.

In FIG. 13, a code conversion circuit 130 having the configuration shown in FIG. 10 generates the electronic signals indicated by FIGS. 11(G), (H) from the electronic signals supplied to the terminal 80, 81 and indicated by FIGS. 11(B), (C) and the clock CLK supplied to the terminal 74 and indicated by FIG. 11(A), and supplies the electronic signals to the optical transmission circuit 110 employing a both-side electrode Mach-Zehnder type optical modulator. The optical transmission circuit 110 has the configuration shown in FIG. 5, is supplied with the electronic signals indicated by FIG. 11(J) and FIG. 11(K) and the inverse clock, generates the optical signal (a1, b1, a2, b2, a3, . . . ) as indicated by FIG. 9(I) and obtained by simply bit-multiplexing the electronic signals indicated by FIGS. 11(B), (C), and transmits the optical signal to the optical fiber 120.

Figure 14:
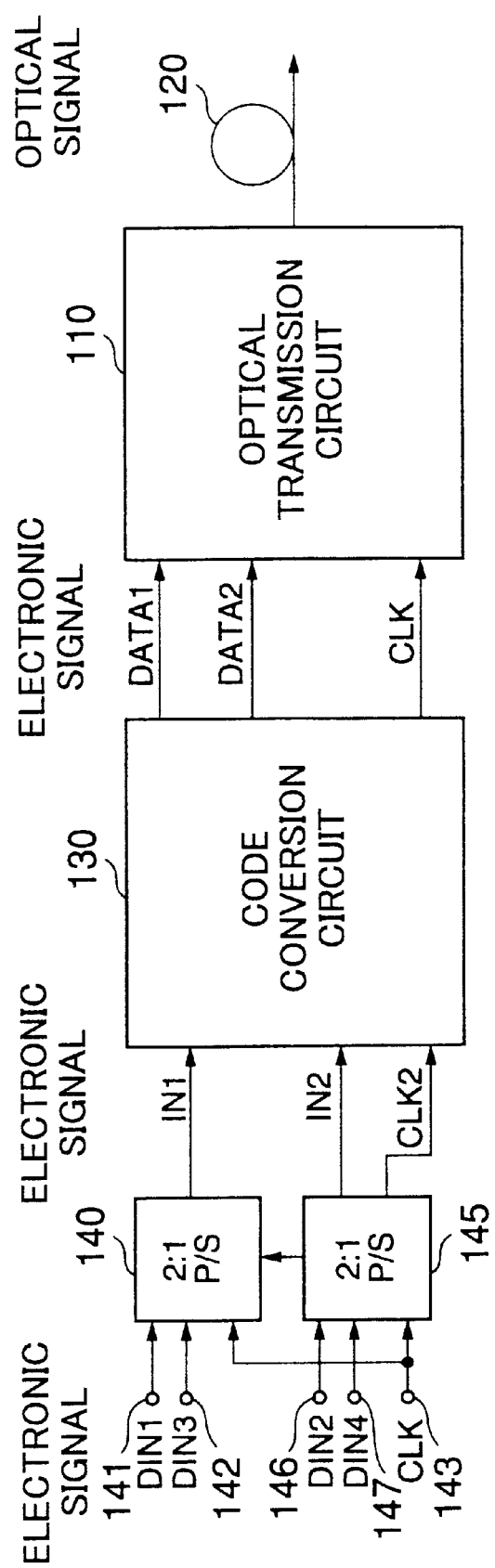
FIG. 14 is a block diagram of a third embodiment of the optical transmitter using the code conversion circuit of the present invention and the both-side electrode Mach-Zehnder type optical modulator.

In FIG. 14, a serializer 140 is supplied with, for example, first and second electronic signals having a bit rate of 2.5

Gb/s to terminals 141 and 142 and a clock CLK having a frequency of 2.5 GHz to a terminal 143, and the serializer 140 outputs an electronic signal being obtained by simply multiplexing these signals and having a bit rate of 5 Gb/s. Additionally, a serializer 145 is supplied with, for example, third and fourth electronic signals having a bit rate of 2.5 Gb/s from terminals 146, 147 and a clock CLK having a frequency of 2.5 GHz from a terminal 143, and the serializer 145 outputs an electronic signal having a bit rate of 5 Gb/s obtained by simply bit-multiplexing these signals and a clock CLK2 having a frequency of 5 GHz.

The code conversion circuit 130 having the configuration shown in FIG. 10 (or FIG. 8) generates and supplies the electronic signals indicated by FIGS. 11(G), (H) and having a bit rate of 5 Gb/s from the electronic signals that are supplied from the serializers 140, 145, having a bit rate of 5 Gb/s and indicated by FIGS. 11(B), (C) to the optical transmitter 110 employing the both-side electrode Mach-Zehnder type optical modulator. The optical transmitter 110 having the configuration shown in FIG. 5 is supplied with the electronic signals indicated by FIG. 11(J) and FIG. 11(K) and the inverse clock, generates and transmits, to the optical fiber 120, the optical signal (a1, b1, a2, b2, a3, ...) as indicated by FIG. 9(I) having a frequency of 10 GHz and obtained by simply bit-multiplexing the electronic signals indicated by FIGS. 11(B), (C).

As described above, the output optical signal is Exclusive-OR of the two electronic signals output by the code conversion circuit 130, that is, a signal obtained by simply bit-multiplexing the first and second electronic signals that are the input of the code conversion circuit 130 and having a twice frequency. Thus it is possible to transmit a high-speed optical signal having a twice bit rate with respect to the electronic signals.

Figure 15:
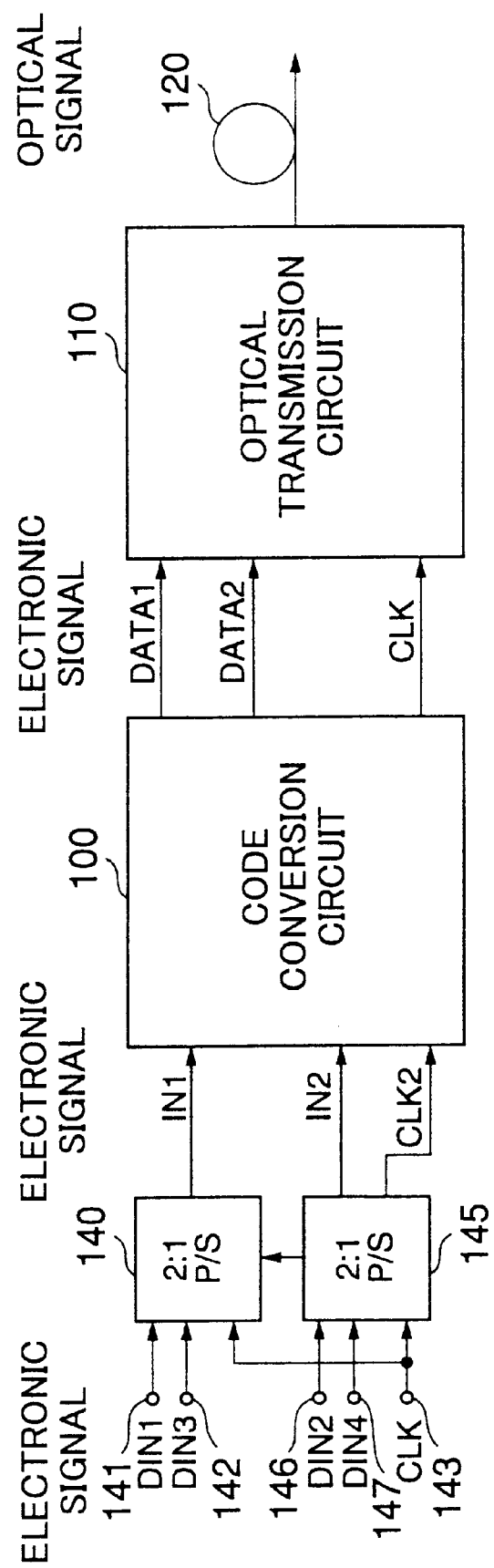
FIG. 15 is a block diagram of a fourth embodiment of the optical transmitter using the code conversion circuit of the present invention and the both-side electrode Mach-Zehnder type optical modulator.

In addition, in FIG. 14, the code conversion circuit 130 shown in FIG. 10 is used. However, as shown in FIG. 15, the code conversion circuit 100 shown in FIG. 8 may be used instead of the converting circuit 130, and the above-described embodiment is not the limitation.

Further, the Exclusive-OR circuit 42 and the delay circuit 44 correspond to a first arithmetic circuit described in claims. The Exclusive-OR circuit 43 and the delay circuit 45 correspond to a second arithmetic circuit. The delay circuit 48 and the Exclusive-OR circuit 46 correspond to a third arithmetic circuit. The Exclusive-OR circuit 47 corresponds to a fourth arithmetic circuit. The Exclusive-OR circuit 82 corresponds to a first Exclusive-OR circuit. The flip flop 83 corresponds to a first flip flop. The Exclusive-OR circuit 84 corresponds to a second Exclusive-OR circuit. The flip flop 86 corresponds to a second flip flop. The flip flop 88 corresponds to a third flip flop. The serializer 140 corresponds to a first serializer, and the serializer 145 corresponds to a second serializer.

What is claimed is:

1. A code conversion circuit, wherein said code conversion circuit is supplied with first and second signals having a first bit rate, and generates and outputs, through Exclusive-OR operation, third and fourth signals from which signals obtained by simply bit-multiplexing the first and second signals and having a bit rate twice the first bit rate are obtained.

2. The code conversion circuit as claimed in claim 1, comprising:
a first arithmetic circuit that performs Exclusive-OR operation of the first signal and own Exclusive-OR output delayed for one cycle;
a second arithmetic circuit that performs Exclusive-OR operation of the second signal and own Exclusive-OR output delayed for one cycle;
a third arithmetic circuit that performs Exclusive-OR operation of an output signal of said first arithmetic circuit and a signal obtained by delaying an output signal of said second arithmetic circuit for one cycle so as to output the third signal; and
a fourth arithmetic circuit that performs Exclusive-OR operation of the output signal of the first arithmetic circuit and the output signal of the second arithmetic circuit,
wherein a signal obtained by delaying an output signal of said fourth arithmetic circuit for the ½ cycle is rendered to be the fourth signal.

3. The code conversion circuit as claimed in claim 2, wherein each of the first arithmetic circuit and the second arithmetic circuit includes an Exclusive-OR circuit and a flip flop that delays an output of said Exclusive-OR circuit for one cycle.

4. The code conversion circuit as claimed in claim 1, comprising:
a first Exclusive-OR circuit that performs Exclusive-OR operation of the first signal and an output of a second flip flop;
a first flip flop that delays the second signal for a ½ cycle in synchronization with an inverse clock;
a second Exclusive-OR circuit that performs Exclusive-OR operation of an output signal of said first flip flop and an output of a third flip flop;
said second flip flop that outputs an output signal of said second Exclusive-OR circuit by delaying for a ½ cycle in synchronization with a clock; and
said third flip flop that outputs an output signal of said first Exclusive-OR circuit by delaying for the ½ cycle in synchronization with the inverse clock.

5. An optical transmitter, comprising:
a code conversion circuit that is supplied with first and second signals having a first bit rate, and generates and outputs, through Exclusive-OR operation, third and fourth signals from which signals obtained by simply bit-multiplexing the first and second signals and having a bit rate twice the first bit rate are obtained; and
an optical transmission circuit that performs optical modulation by a both-side electrode Mach-Zehnder type optical modulator using the third and fourth signals output by said code conversion circuit, and outputs an optical signal that is Exclusive-OR of the third and fourth signals.

6. The optical transmitter as claimed in claim 5, wherein the code conversion circuit comprises:
a first arithmetic circuit that performs Exclusive-OR operation of the first signal and own Exclusive-OR output delayed for one cycle;
a second arithmetic circuit that performs Exclusive-OR operation of the second signal and own Exclusive-OR output delayed for the one cycle;
a third arithmetic circuit that performs Exclusive-OR operation of an output signal of said first arithmetic circuit and a signal obtained by delaying an output signal of said second arithmetic circuit for the one cycle so as to output the third signal; and
a fourth arithmetic circuit that performs Exclusive-OR operation of the output signal of said first arithmetic circuit and the output signal of said second arithmetic circuit, and a signal obtained by delaying an output signal of said fourth arithmetic circuit for the ½ cycle is rendered to be the fourth signal.

7. The code conversion circuit of the optical transmitter as claimed in claim 6, wherein each of the first arithmetic circuit and the second arithmetic circuit includes an Exclusive-OR circuit and a flip flop that delays an output of said Exclusive-OR circuit for the one cycle.

8. The optical transmitter as claimed in claim 5, wherein the code conversion circuit comprises:
a first Exclusive-OR circuit that performs Exclusive-OR operation of the first signal and an output of a second flip flop;
a first flip flop that delays the second signal for a ½ cycle in synchronization with an inverse clock;
a second Exclusive-OR circuit that performs Exclusive-OR operation of an output signal of said first flip flop and an output of a third flip flop;
said second flip flop that outputs an output signal of said second Exclusive-OR circuit by delaying for the ½ cycle in synchronization with a clock; and
said third flip flop that outputs an output signal of said first Exclusive-OR circuit by delaying for the ½ cycle in synchronization with the inverse clock.

9. An optical transmitter, comprising:
a first serializer that generates a first signal by simply bit-multiplexing a plurality of series of signals;
a second serializer that generates a second signal by simply bit-multiplexing another plurality of series of signals;
the code conversion circuit as claimed in claim 3 supplied with the first and second signals; and
an optical transmission circuit that performs optical modulation by a both-side electrode Mach-Zehnder type optical modulator using the third and fourth signals output by the code conversion circuit, and outputs an optical signal that is Exclusive-OR of the third and fourth signals.

10. An optical transmitter, comprising:
a code conversion circuit, including:
a first serializer that generates a first signal having a first bit rate by simply bit-multiplexing a plurality of series of signals;
a second serializer that generates a second signal having the first bit rate by simply bit-multiplexing another plurality of series of signals;
a first arithmetic circuit that performs Exclusive-OR operation of the first signal and own Exclusive-OR output delayed for one cycle;
a second arithmetic circuit that performs Exclusive-OR operation of the second signal and own Exclusive-OR output delayed for the one cycle;
a third arithmetic circuit that performs Exclusive-OR operation of an output signal of said first arithmetic circuit and a signal obtained by delaying an output signal of said second arithmetic circuit for the one cycle so as to output a third signal; and
a fourth arithmetic circuit that performs Exclusive-OR operation of the output signal of said first arithmetic circuit and the output signal of said second arithmetic circuit,
wherein a signal obtained by delaying an output signal of said fourth arithmetic circuit for a ½ cycle is rendered to be a fourth signal; and
an optical transmission circuit that performs optical modulation by a both-side electrode Mach-Zehnder type optical modulator using the third and fourth signals output by said code conversion circuit, and outputs an optical signal that is Exclusive-OR of the third and fourth signals.

11. An optical transmitter, comprising:
a code conversion circuit, including:
a first serializer that generates a first signal by simply bit-multiplexing a plurality of series of signals;
a second serializer that generates a second signal by simply bit-multiplexing another plurality of series of signals;
a first Exclusive-OR circuit that performs Exclusive-OR operation of the first signal and an output of a second flip flop;
a first flip flop that delays the second signal for a ½ cycle in synchronization with an inverse clock;
a second Exclusive-OR circuit that performs Exclusive-OR operation of an output signal of said first flip flop and an output of a third flip flop;
said second flip flop that outputs an output signal of said second Exclusive-OR circuit by delaying for the ½ cycle in synchronization with a clock; and
said third flip flop that outputs an output signal of said first Exclusive-OR circuit by delaying for the ½ cycle in synchronization with the inverse clock; and
an optical transmission circuit that performs optical modulation by a both-side electrode Mach-Zehnder type optical modulator using third and fourth signals output by said code conversion circuit, and outputs an optical signal that is Exclusive-OR of the third and fourth signals.

* * * * *